Dec. 17, 1963   J. W. KLOSS   3,114,337
CAR LOADING STRUCTURE
Filed March 22, 1961

INVENTOR.
John W Kloss
BY Ralph Hammar
Attorney 3,114,337
CAR LOADING STRUCTURE
John W. Kloss, Erie, Pa., assignor to Lord Manufacturing Company, Erie, Pa., a corporation of Pennsylvania
Filed Mar. 22, 1961, Ser. No. 97,633
5 Claims. (Cl. 105—369)

This invention is intended to provide shock protection for vehicles and other sensitive lading carried on freight cars. Shoring and bracing are eliminated and the lading is anchored to the freight car by flexible tension members including self aligning shear sandwich rubber springs.

Figure 1:
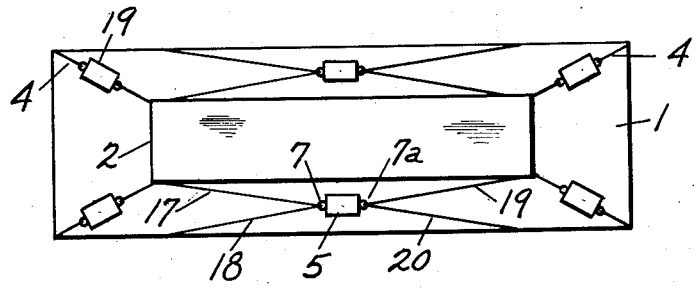
Figure 2:
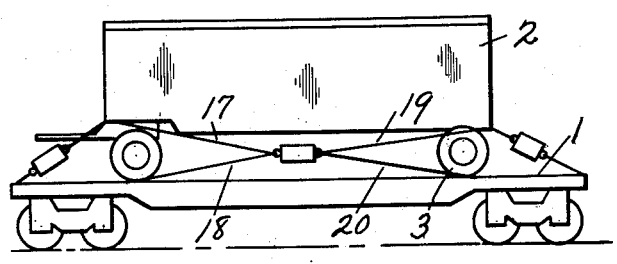
Figure 3:
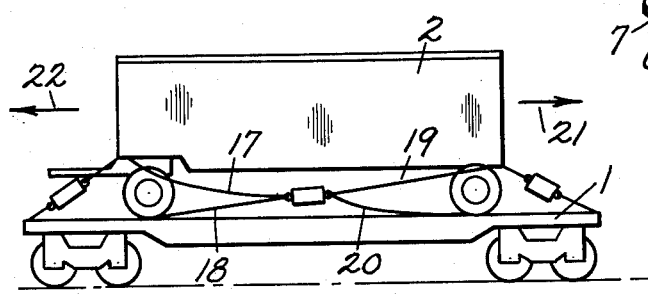
Figure 4:
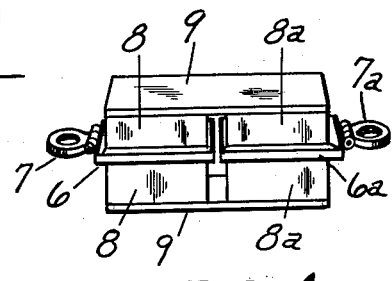
Figure 5:
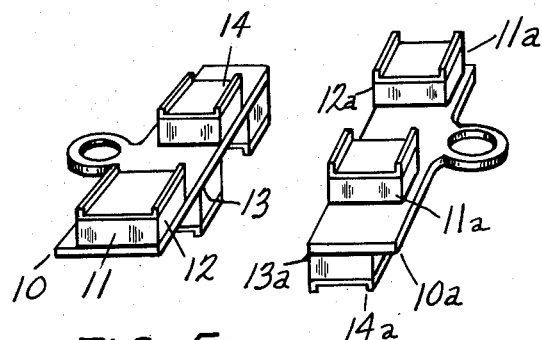
Figure 6:
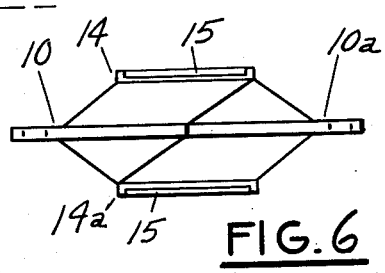

In the drawing, FIG. 1 is a top plan view of a vehicle secured to a freight car, FIG. 2 is a side elevation, FIG. 3 is a similar view showing the position assumed by the vehicle under shock, FIG. 4 is a perspective of a shear sandwich rubber spring used in the flexible tension members, FIG. 5 is a perspective of the parts of another form of shear sandwich rubber spring and FIG. 6 is a side view of the assembly of the parts of FIG. 5.

In the drawing, 1 indicates the floor of a freight car and 2 indicates a trailer extending fore and aft of the freight car and supported by its wheels 3. The rubber tires of the wheels 3 may supply enough cushioning for impacts transverse to the length of the freight car. Under longitudinal impacts, the trailer rolls on its wheels to the extent permitted by flexible tie-down members 4 and 5. This takes up the shock and thereby protects the load in the trailer.

Each of the tie-downs has a shear sandwich rubber spring construction having center metal plates 6 and 6a in end to end relation and with the ends of the plates remote from each other provided with eyes 7 and 7a for connection to the chain or cable of the tie-down. On opposite sides of the center plates 6 and 6a are bodies 8 and 8a of natural or synthetic rubber or like elastomeric material respectively bonded to the plates 6 and 6a and to outer plates 9 common to both bodies. Under tension load applied to the eyes, the rubber bodies 8 and 8a are stressed in shear between the center plates 6, 6a and the outer metal plates 9. The plates 6 and 6a inherently align with the tension applied through eyes 7 and 7a since the action of the elastomeric bodies 8 and 8a is such as to divide the applied force evenly, half passing through the upper pair 8 and 8a, and half through the lower pair 8 and 8a of the elastomeric material. Uniform distribution of stress in the bonds between the elastomeric bodies 8 and 8a, and the metal plates 6, 6a and 9, to which they are bonded, also results.

The spring of FIGS. 5 and 6 is preloaded so that there is no deflection until the force caused by the shock exceeds the preload force. This construction has center plates 10 and 10a to opposite sides of which are bonded staggered rubber bodies 11 and 11a. The plates 10 and 10a are in end to end relation in the same manner as the plates 6 and 6a. In the as molded condition shown in FIG. 5, the bodies 11 and 11a are rectangular blocks with adjacent faces 12 and 12a flush with adjacent ends 13 and 13a of the plates 10 and 10a. The spaces between adjacent bodies 11 are equal to the spaces between adjacent bodies 11a and the staggering of the bodies is such that when the adjacent ends 13 and 13a of the plates are brought together, each body on one of the plates is opposite a space on the other of the plates. The faces of the bodies 11 and 11a remote from the plates 10 and 10a are bonded to individual outer metal plates 14 and 14a. After molding, the outer plates 14 or 14a on each central plate are offset toward the outer plates on the other central plate to subject the bodies 11, 11a to shear stress relative to the central plates 10, 10a in the direction to resiliently urge the central plates toward each other. When these plates are brought into alignment and fixed together by cross plates 15, the bodies 11 and 11a are preloaded in the direction to hold the abutting edges 13 and 13a of the plates 10 and 10a together. From one aspect, the plates 15 hold the plates 14, 14a in fixed relation to each other in the offset position. The plates 15 also prevent relative movement of the outer and central plates in the direction to decrease the initial offsetting. This produces the same preload as would be obtained if after molding, the plates 6 and 6a were pulled apart by a force slightly greater than the desired preload and a spacer were inserted between the adjacent ends of plates 6 and 6a to hold the plates apart a distance corresponding to the desired preload. Under a tension load applied to the remote ends of the plates 10 and 10a, there accordingly is no deflection until the tension stress exceeds the preload. This means that for shocks producing stress of magnitude less than the preload, the vehicle is solidly anchored to the floor of the car. Under larger shocks, the plates 10 and 10a separate, thereby permitting the yielding or cushioning action.

In the arrangement shown in FIGS. 1 to 3 inclusive, the shear sandwich rubber spring units 16 may be either of the type shown in FIG. 4 or of the type shown in FIGS. 5 and 6.

The tension of the tie-down members 4 at the ends of the vehicle 2 are single acting, that is, they act only to cushion shock producing forces in the direction to stretch the tension members. Shocks in the direction to move the vehicle to the right are cushioned by the tension members 4 at the left end of the vehicle while shocks in the opposite direction are cushioned by the tension members at the right end of he vehicle. The tension members 5 at the sides of the vehicles are double acting in the sense that they act to cushion shocks in both directions. This is achieved by having each eye 7, 7a of the rubber spring unit connected to two cables or chains, one of which is connected to the vehicle 2 and the other to the floor of the railroad car. For example, at one end of the vehicle is a chain 17 connected from the eye 7 to the vehicle and from the same eye is a chain 18 connected to the floor of the railroad car. At the opposite end of the vehicle is a chain 19 connected between the vehicle and the eye 7a and at the same eye is another chain 20 connected to the floor of the railroad car. The chains 17 and 20 are in substantial alignment and the chains 18 and 19 are in substantial alignment under no load conditions. Under shock producing load in the direction of the arrow 21, the chains 18 and 19 are tensioned while the chains 17 and 20 are limp. Under shock producing load in the direction of arrow 22, the chains 17 and 20 are tensioned while the chains 18 and 19 are limp. This permits a single rubber spring unit to cushion shocks in both directions. Other arrangements of single and double acting tension members may be used.

Upon impact, the tie-downs deflect to absorb shock. The amount of deflection is determined by the spring rates of the elastomeric springs and their physical sizes, by the mass of the vehicle 2, and by the magnitude of the imposed shock. The tie-downs may be made to deflect as much as 20 inches and can absorb up to 90% of the shock. Therefore, lading which previously could not be shipped by rail, can now be so shipped without damage. Greater or lesser deflection can be obtained by suitable design. In use the lading is able to move both fore and aft yet is held securely and is under control at all times. After the shock has passed and been absorbed by relative motion between the vehicle 2 and the freight car 1, the lading returns to its original position on the car.

What is claimed as new is:

1. In a vehicle transporting freight car having a floor, a vehicle supported by its wheels on the floor and extending fore and aft of the car, tie-down members having flexible strands connected between the floor and the corners of the vehicle and extending generally in a fore and aft direction, each tie-down member having at least two strands, one strand connected to a corner of the vehicle and the other connected to the floor and both strands being in alignment with each other and with adjacent ends spaced from each other, two central metal plates arranged in end to end relation between said adjacent ends of the strands, the ends of the central plates remote from each other being respectively connected to one and the other of said adjacent ends of the strands and each central plate being in substantially direct continuation of the strand to which it is connected, two outside metal plates respectively spaced on one and the other side of the central plates, each outside plate being opposite both central plates, and bodies of rubber sandwiched between and bonded to each outside plate and the adjacent side of each central plate and constituting a shock absorbing connection between the central plates.

2. In a vehicle transporting freight car having a floor, a vehicle supported by its wheels on the floor and extending fore and aft of the car, a tie-down member having two pair of flexible strands respectively connected between the floor and a different corner of the vehicle, the strands of the pairs extending generally in a fore and aft direction and intersecting at an acute angle, one strand of each pair being connected to a corner of the vehicle and the other being connected to the floor and both strands of each pair being in substantial alignment with each other and with adjacent ends of each pair spaced from each other, the adjacent ends of both pairs being side by side, two central metal plates arranged in end to end relation between said adjacent ends of both pairs of strands, the ends of the central plates remote from each other and being respectively connected to one and the other of the side by side adjacent ends of each pair of strands, and two outside metal plates respectively spaced on one and the other side of the central plates, each outside plate being opposite both central plates, and bodies of rubber sandwiched between and bonded to each outside plate and the adjacent side of each central plate and constituting a shock absorbing connection between the central plates for tension stress in each pair of strands.

3. In a vehicle transporting freight car having a floor, a vehicle supported by its wheels on the floor and extending fore and aft of the car, tie-down members having flexible strands connected between the floor and the corners of the vehicle and extending generally in a fore and aft direction, each tie-down member having at least two strands, one strand connected to a corner of the vehicle and the other connected to the floor and both strands being in alignment with each other and with adjacent ends spaced from each other, two central metal plates arranged in end to end relation between said adjacent ends of the strands, the ends of the central plates remote from each other being respectively connected to one and the other of said adjacent ends of the strands and each central plate being in substantially direct continuation of the strand to which it is connected, bodies of rubber respectively bonded to and outstanding from one and the other side of each central plate, the bodies on one of the central plates being staggered with respect to the bodies on the other of the central plates so that each body on one of the central plates in its unstressed condition is opposite a space on the other of the central plates, an outer plate spaced from each central plate and bonded to each body, said outer plates on the bodies on each central plate being offset after molding toward the outer plates on the bodies on the other central plate to subject the bodies to shear stress in the direction to resiliently urge the central plates toward each other with a preload proportional to the shear stress applied to the bodies, and means for holding said outer plates in fixed relation to each other in the offset position.

4. In a vehicle transporting freight car having a floor, a vehicle supported by its wheels on the floor and extending fore and aft of the car, tie-down members having flexible strands connected between the floor and the corners of the vehicle and extending generally in a fore and aft direction, each tie-down member having at least two strands, one strand connected to a corner of the vehicle and the other connected to the floor and both strands being in alignment with each other and with adjacent ends spaced from each other, two central metal plates arranged in end to end force transmitting relation between said adjacent ends of the strands under the unstressed condition of the strands, the ends of the central plates remote from each other being respectively connected to one and the other of said adjacent ends of the strands and each central plate being in substantially direct continuation of the strand to which it is connected, outside metal plates respectively spaced on one and the other side of the central plates, each outside plate being opposite both central plates, bodies of rubber sandwiched between and bonded to each outside plate and to the adjacent side of each central plate and constituting a shock absorbing connection between the central plates, said bodies in the unstressed condition of the strands being subjected to shear stress relative to the central plates initially offsetting of the outer and central plates in the direction tending to resiliently urge the central plates toward each other with a preload proportional to the shear stress applied to the bodies, and means for preventing relative movement of the outer and central plates in the direction to decrease said initial offsetting.

5. In a freight car having a floor, lading supported on the floor and extending fore and aft of the car, tie-down members having flexible strands connected between the floor and the lading and extending generally in a fore and aft direction, each tie-down member having at least two strands, one strand connected to the lading and the other connected to the floor and both strands being in alignment with each other and with adjacent ends spaced from each other, two central metal plates arranged in end to end relation between said adjacent ends of the strands, the ends of the central plates remote from each other being respectively connected to one and the other of said adjacent ends of the strands and each central plate being in substantially direct continuation of the strand to which it is connected, two outside metal plates respectively spaced on one and the other side of the central plates, each outside plate being opposite both central plates, and bodies of rubber sandwiched between and bonded to each outside plate and the adjacent side of each central plate and constituting a shock absorbing connection between the central plates.

References Cited in the file of this patent

UNITED STATES PATENTS

| | | |
|---|---|---|
| 2,128,667 | Atherton | Aug. 30, 1938 |
| 2,227,870 | Thomas | Jan. 7, 1941 |
| 2,873,693 | Chapman et al. | Feb. 17, 1959 |